United States Patent [19]

Arnaud

[11] 4,106,847
[45] Aug. 15, 1978

[54] NONCIRCULAR SYMMETRIC OPTICAL FIBER WAVEGUIDE HAVING MINIMUM MODAL DISPERSION

[75] Inventor: Jacques Alexis Arnaud, Colts Neck, N.J.

[73] Assignee: Bell Telephone Laboratories, Incorporated, Murray Hill, N.J.

[21] Appl. No.: 720,982

[22] Filed: Sep. 7, 1976

[51] Int. Cl.$^2$ .............................................. G02B 5/14
[52] U.S. Cl. .................. 350/96.31; 350/96.30; 350/96.34
[58] Field of Search ................... 350/96 WG, 96 GN

[56] References Cited

U.S. PATENT DOCUMENTS

| | | | |
|---|---|---|---|
| 3,904,268 | 9/1975 | Keck et al. ................... | 350/96 WG |
| 4,057,320 | 11/1977 | Marcatili ......................... | 350/96.31 |

OTHER PUBLICATIONS

Miller, "Light Propagation in Generalized Lens-Like Media," Bell Syst. Tech. Journal, Nov. 1965, pp. 2017-2064.
Arnaud, "Pulse Broadening in Multimode Optical Fibers," Bell Syst. Tech. Journal, Sep. 1975, pp. 1179-1205.
Arnaud, Beam and Fiber Optics, Section 5.19, pp. 418-428, Academic Press, Inc., New York, Feb. 1976.
Arnaud et al., "Pulse Broadening in Multimode Optical Fibers with Large n/n . . .," Elect. Letters, Apr. 1, 1976, pp. 167-169.

*Primary Examiner*—John K. Corbin
*Assistant Examiner*—John D. Lee
*Attorney, Agent, or Firm*—Daniel D. Dubosky

[57] ABSTRACT

An optical fiber waveguide is disclosed wherein the cladding surrounds a fiber core having a noncircularly symmetric cross section. Equations are presented which dictate the value of the index of refraction that must be provided at each spatial point within the fiber core in order to construct a fiber waveguide having minimum modal dispersion. An especially useful optical fiber waveguide is disclosed with an elliptical fiber core thereby providing a fiber which can be more efficiently coupled to a light emitting source having an elongated source area such as in a heterojunction laser or an edge-emitting light emitting diode.

2 Claims, 5 Drawing Figures

NONCIRCULAR SYMMETRIC OPTICAL FIBER WAVEGUIDE HAVING MINIMUM MODAL DISPERSION

BACKGROUND OF THE INVENTION

This invention relates to optical fiber waveguides, and, more particularly, to optical fiber waveguides wherein a central core of optical material is surrounded by a cladding material having a lower index of refraction. This invention also relates to optical fiber waveguides wherein the core-cladding interface has a cross-sectional boundary which is noncircular.

Optical fiber waveguides are now well recognized in the art as desirable mediums for use in the transmission of optical energy. Typically, the optical fiber waveguide consists of a core of optical material having a circular cross section surrounded by a cladding material having a lower index of refraction. If the core is made sufficiently small in diameter relative to the wavelength of light to be transmitted, a single mode of energy is propagated along the core and no dispersion is introduced by virtue of differences in transit time for multiple mode paths within the core. This single mode type of optical fiber is presently impractical however, primarily due to the fact that many of the sources now available for optical transmission systems do not radiate single modes. Instead these sources generate their power into many modes. In addition, the single mode fiber is presently impractical from the standpoint of performing splices of this fiber within the field since the core is so small. Consequently, the multimode fiber has become of much greater practical significance. In the multimode fiber the core diameter is large relative to the wavelength of light being transmitted and the energy is transmitted from transmitting to receiving end by way of several modes that are operative within the fiber.

In the step index fiber wherein the core has a uniform index of refraction, the modes which travel along the axis of the core arrive at the receiving location at a point earlier in time than the modes which transmit by way of multiple reflections from the core-cladding interface. This introduces a dispersion now commonly known in the art as modal dispersion. The first technique for minimizing the effect of modal dispersion was set forth by S. E. Miller in his article entitled "Light Propagation in Generalized Lens-Like Media", *Bell System Technical Journal*, Vol. 44, 1965, pages 2017–2064. In accordance with this Miller technique, the index of refraction is caused to change along the radial dimension of the fiber core. The index at the core center has the highest value and the index is changed in a roughly parabolic shape so as to decrease to the value of the index in the cladding at the core-cladding interface. This technique assumed that the material dispersion $dn^2/d\lambda$ is negligible, where $n$ is the index of refraction and $\lambda$ is the wavelength of the propagating energy.

It was subsequently discovered that material dispersion cannot be neglected particularly in fibers where the change in the index of refraction is caused to occur by the addition of a substantial amount of additional material known to the art as a dopant. If the added amount of this dopant is low in molar concentration the material dispersion $dn^2/d\lambda$ is approximately linear with respect to the square, $n^2$, of the index of refraction. Under these circumstances, the analysis by Gloge and Marcatili was extended by D. B. Keck and R. Olshansky to cover optical fibers wherein the material dispersion $dn^2/d\lambda$ is a linear function of $n^2$. See for example, their U.S. Pat. No. 3,904,268 entitled "Optical Waveguide Having Optical Index Gradient" issued Sept. 9, 1975. It was determined by Keck and Olshansky that the index profile must still follow a power law shape for minimum modal dispersion but the exponent in the index profile equation was determined to require a value other than the value determined by Miller.

Most recently, it has been discovered by J. A. Arnaud and J. W. Fleming and reported in their article entitled "Pulse Broadening in Multimode Optical Fibers with Large Δn/n: Numerical Results", *Electronics Letters*, Apr. 1, 1976, Vol. 12, No. 7, that the material dispersion $(dn^2/d\lambda)$ cannot be assumed to be a linear function of the index of refraction squared $(n^2)$ particularly where there are large molar concentrations of dopant that are added to achieve the index profile and also in cases where boron oxide is utilized as a dopant. To achieve minimum modal dispersion in those cases where the material dispersion has an arbitrary dependence on the index of refraction, the index profile can be determined by the inventive technique set forth in the copending application by E. A. J. Marcatili entitled "Optical Fiber Waveguide Having Minimum Modal Dispersion" issued on Nov. 8, 1977 as U.S. Pat. No. 4,057,320. In accordance with this Marcatili invention, the radius $r$ at which each value of the index of refraction $n$ must be located is given in terms of the following equation:

$$r = a \exp \int_F^{2\Delta} \frac{dF}{[2 - d(2-p)]F},$$

where F is a profile function defined by the equation $$F = 1 - n^2/n_o^2,$$

$a$ is the radius of the core-cladding interface, $n_o$ is the index of refraction on the core axis, $d$ is a constant when the fiber is operated at a single wavelength, $p$ is a profile dispersion parameter determined by measurements on the optical material to be used in the core, and $\Delta$ is the relative change of refractive index in the fiber cross-section, $$\Delta = \frac{1}{2} \left( \frac{1 - n_c^2}{n_o^2} \right),$$

$n_c$ being the index of refraction in the cladding.

As pointed out in the above-identified Marcatili application, his design equations used to obtain minimum modal dispersion are restricted for use with circularly symmetric fibers. Noncircularly symmetric fibers are also of considerable interest in the optical fiber waveguide art. Optical fibers having a noncircularly symmetric profile may prove to be less sensitive to bending losses than fibers with circularly symmetric profiles if bending takes place in one preferred plane. Fibers with noncircularly symmetric profiles would also be easier to couple to the many optical sources that have emitting areas that are shaped in a noncircular fashion. For example, injection lasers and edge-emitting light emitting diodes having large junction widths may be more easily coupled to fibers whose profile is elongated in one direction as compared with fibers having circularly symmetric index profiles.

BRIEF SUMMARY OF INVENTION

In accordance with the present invention minimum modal dispersion comparable to that achieved in circularly symmetric fibers can be obtained in noncircularly symmetric fibers. The present invention is based on the discovery that the analysis presented in the Marcatili application can be extended to cover optical fibers having index profiles other than those which are circularly symmetric.

In accordance with the present invention a material system is first chosen to be used in providing an index profile in the core of the optical fiber waveguide. Preferably, this system should be one in which only a single dopant is used to provide the index of refraction at a single spatial point within the fiber core. More than one dopant can on the other hand be utilized at different spatial points within the fiber core. The material with the concentration of the dopant which yields the highest index of refraction is first chosen as the material to be used at the geometrical center of the fiber. The index of refraction provided by this material is designated as $n_o$. The material which yields the lowest index of refraction is then chosen as the material to be placed at the core-cladding interface of the optical fiber, and the index of refraction of this lowest index material is designated as $n_c$. All other materials to be used in the fiber core with refractive index $n$ have a relative phase index N with respect to the fiber core determined by the following equation:

$$N(x,y,\lambda) = 1 - n^2(x,y,\lambda)/n_o^2(\lambda).$$

In addition, a relative group index $\bar{N}$ can be determined for each of the materials to be used in the fiber core in terms of N by the following equation:

$$\bar{N} = [N + (S_o - S)/n_o^2]/(1 + S_o/n_o^2)$$

where S is defined by $S \equiv - (\lambda/2)dn^2/d\lambda$ which in turn is determined by measurements on the materials to be used in the fiber core, and $S_o$ is the value of S at the core center. An optical fiber waveguide with minimum modal dispersion can be achieved in accordance with the present invention if the material corresponding to a particular relative phase index N is positioned at coordinates $x$ and $y$ with respect to the core center in accordance with the following equation:

$$h(x,y) = \exp\left\{ \int_{2\Delta}^{N} [(1 + x)\bar{N} - N]^{-1} dN \right\}$$

where $h(x,y)$ is an arbitrary homogeneous function of degree 2 in $x$ and $y$ other than a multiple of $(x^2 + y^2)$, and X is approximately equal to $\sqrt{1 - 2\Delta}$.

Accordingly, measurements on bulk samples of both the index of refraction (n) and the rate of change of this index squared with respect to wavelength ($dn^2/d\lambda$) can be utilized to compute the relative group index for the materials system chosen to be used. The position of any given concentration of dopant within the fiber core can then be determined by solving the above integral expression using the particular value of the relative phase index N for each particular dopant concentration. Inasmuch as $h(x,y)$ is any arbitrary homogeneous function of degree 2 in $x$ and $y$ this function $h$ will then provide the locus for each index of refraction under consideration. By solving the integral expression for all of the materials to be used within the fiber core, an entire map or contour of the index of refraction within the fiber core is provided in terms of the spatial coordinates $x$ and $y$.

One especially interesting index profile is the one which corresponds to a core-cladding interface having an elliptic contour. In this case the function h is defined by the following equation:

$$h(x,y) = \left(\frac{x}{a}\right)^2 + \left(\frac{y}{b}\right)^2$$

where $a$ is the distance along the $x$ axis from the core center for the core-cladding interface, and $b$ is the distance along the $y$ coordinate from the core center for the core-cladding interface. With this type of index profile having a core-cladding interface with an elliptical geometry, the cross-section of the fiber core can be constructed so as to be much larger in one dimension than in the other. Accordingly, the optical fiber having this shape can be more easily coupled to an optical source such as a heterojunction laser or light emitting diode with an emitting area much longer in one dimension than in the other.

BRIEF DESCRIPTION OF THE DRAWING

The invention will be more readily understood after reading the following detailed description in conjunction with the drawings wherein.

DETAILED DESCRIPTION

Figure 1:
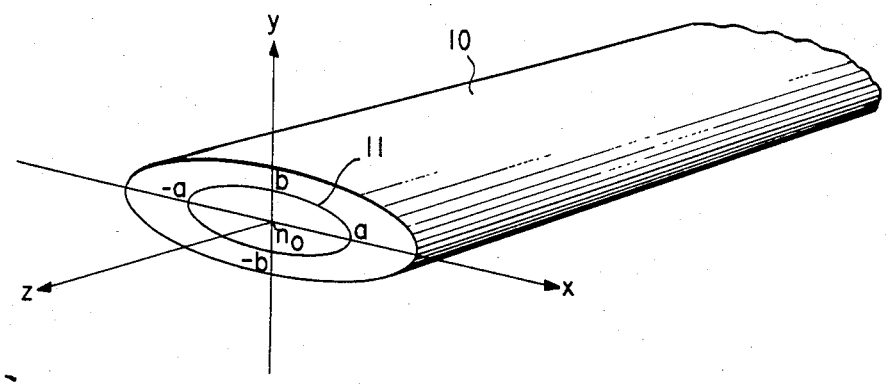
FIG. 1 is a pictorial illustration of an optical fiber in cross-section constructed in accordance with the present invention.

As pointed out hereinabove, an optical fiber waveguide with a noncircular fiber core can be more easily coupled to optical sources having emitting areas that are elongated in one direction. The entire purpose of the mathematical equations which follow is to provide a means whereby the index of refraction can be computed for each spatial location within the fiber core such that when these indices are established in the optical fiber core, the fiber will transmit optical energy with minimum modal dispersion. Hence, the mathematics of the present invention can be thought of as providing a map of the refractive index which must be obtained in a noncircularly symmetric fiber in order to achieve minimum modal dispersion.

Instead of dealing directly with the refractive index $n$ it is convenient to define a relative phase index N by the following equation:

$$N(x,y,\lambda) = 1 - n^2(x,y,\lambda)/n_o^2(\lambda) \tag{1}$$

where $n_o$ denotes the refractive index at the geometrical center of the fiber core. The value of the relative phase index N at the geometrical center of axis of the fiber is equal to zero and the value of N at the core-cladding interface is equal to $2\Delta$ where $$\Delta = (\tfrac{1}{2})(1 - n_c^2/n_o^2) \approx \Delta n/n, \tag{2}$$

and $n_c$ is the refractive index in the cladding.

In accordance with measurement techniques described by J. W. Fleming at the Fall Meeting of the American Ceramic Society at Pocono Manner, Pennsylvania, October, 1975, measurements of the index of refraction $n$ and $dn^2/d\lambda$, the rate of change of the index of refraction squared with respect to wavelength, can be obtained on bulk samples using dopants of various concentrations. These measurements can then be utilized to compute a relative group index N in accordance with the following equations:

$$\overline{N} = [N + (S_o - S)/n_o^2]/(1 + S_o/n_o^2) \tag{3}$$

where S is defined by the following equation:

$$S = -(\lambda/2)\delta n^2/\delta\lambda \tag{4}$$

and $S_o$ is the value of S on the fiber axis. The technique for evaluating the relative group index $\overline{N}$ and the derivation of the above equation for the relative group index is set forth in Appendix A to this specification. In the absence of material dispersion, $\overline{N}$ equals N. Hence, the relative group index $\overline{N}$ is simply a parameter which can be obtained as a function of N for all of the materials using various concentrations of dopant that are to be used in the construction of the optical fiber waveguide.

In the mathematical derivation given in Appendix B of this specification, it is shown that minimum modal dispersion can be achieved if the index of refraction (in terms of the relative phase index N) is mapped so as to satisfy the following equation:

$$h(x,y) = \exp\left\{\int_{2\Delta}^{N} [(1+x)\overline{N} - N]^{-1} dN \right\} \tag{5}$$

where X is approximately equal to $\sqrt{1-2\Delta}$, and $h(x,y)$ is an arbitrary homogeneous function of degree 2 in x and y. Such a function satisfies the following equality:

$$h(\gamma x, \gamma y) = \gamma^2 h(x,y) \tag{6}$$

for any given $\gamma$. One such function that satisfies this criteria is of course a circle:

$$h(x,y) = (x^2 + y^2)/a^2 \equiv (r/a)^2. \tag{7}$$

Under these circumstances equation 5 is identical to the result achieved by Marcatili in his above-identified patent application if the following changes in notation are made:

$$N \to F, \overline{N}/N \to 1-p/2, X \to d-1.$$

Other functions of interest to the present invention also satisfy this criteria $$h(x,y) = c_x x^2 + c_y y^2 + c_{xy} xy \tag{8}$$

$$h(x,y) = (c_x x^\alpha + c_y y^\alpha)^{2/\alpha} \tag{9}$$

where $c_x$, $c_y$ and $c_{xy}$ and $\alpha$ denote arbitrary constants.

It is advisable to initiate the integration in equation (5) at $N = 2\Delta$. For that value of N, the integral is equal to zero and therefore $h(x,y) = 1$. This value of N corresponds to the core-cladding interface and therefore $h(x,y) = 1$ is the locus of the core-cladding interface. For values of $N << 2\Delta$, $\overline{N}$ is approximately proportional to N and the integral in equation (5) diverges logarithmically. Thus, for $N = 0$, we have $h(x,y) = \exp(-\infty) = 0$, in agreement with the definitions used.

It is shown in Appendix B that, in the special case where $\overline{N}$ is proportional to N (or $dn^2/d\lambda$ is linear in $n^2$) the optimum profile is a power-law profile, as was shown before for circularly symmetric profiles by R. Olshansky and D. B. Keck, "Material Effects on Minimizing Pulse Broadening", Applied Optics 15, February 1976, page 483, and for arbitrary profiles by J. A. Arnaud "Pulse Broadening in Multimode Optical Fibers", *Bell System Technical Journal* 54, September 1975, page 1174. For all the profiles generated by equation (5), the rms impulse response width has a value of about $200\Delta^2$ nsec/km.

Of special interest in connection with the present invention is the solution of equation (5) when the index profile function is elliptical in nature as expressed by the following equation:

$$h(x,y) = (x/a)^2 + (y/b)^2 \tag{10}$$

where a and b are arbitrary constants not equal to each other. The core-cladding interface contour is, in that case, an ellipse defined by the following equation:

$$(x/a)^2 + (y/b)^2 = 1 \tag{11}$$

As will be appreciated by those skilled in the art $a$ corresponds to the intersection of the core-cladding interface with the x axis and $b$ corresponds to the intersection of the core-cladding interface with the y axis. Such an optical fiber is illustrated in cross-section in FIG. 1 of the drawings. As illustrated in FIG. 1, optical fiber 10 has a core-cladding interface 11 with an elliptical shape. This ellipse is defined in terms of x,y coordinates having their origin at the geometrical center or axis of the fiber core.

In order to illustrate how the derived equations are utilized to develop the values for the index of refraction within this elliptical fiber core, a particular set of illustrative materials with dopants are chosen. In the embodiment to be described, a one parameter series of materials is chosen, that is, the dopant concentrations are functions of a single parameter and are not allowed to vary independently for the purpose of changing the index of refraction. The highest index of refraction is provided by a molar concentration of 17 percent germanium oxide in the silicon dioxide fiber, and the lowest index of refraction is provided by a molar concentration of 7 percent boron oxide in the silica fiber.

Figure 2:
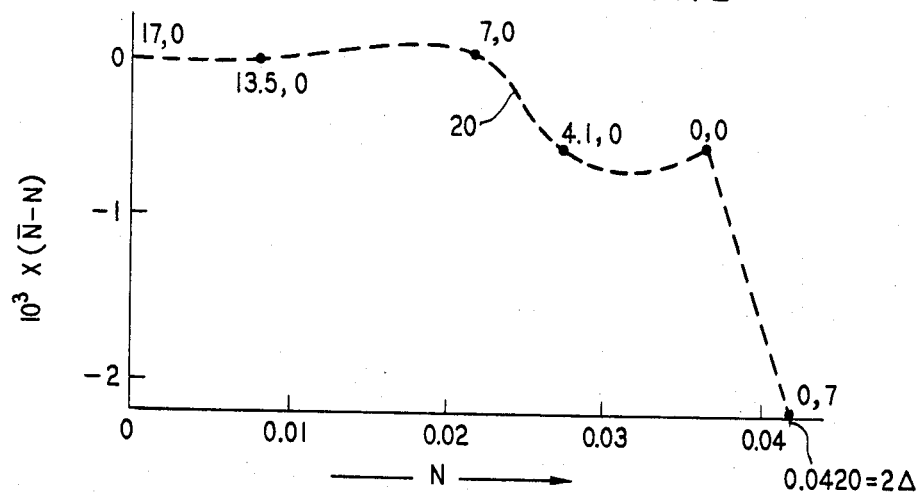
FIG. 2 is a waveform which illustrates the type of values achieved for the relative group index $\bar{N}$ using a materials system with various concentrations of both germanium oxide and boron oxide in a silicon dioxide fiber.

Once this one-parameter series of materials to be used in the fiber has been selected and the particular value for the refractive index on axis $n_o$ has been chosen, the relative group index $\overline{N}$ can be considered a function of N. As pointed out hereinabove, $\overline{N}$ equals N when there is no material dispersion. The departure of the relative group index $\overline{N}$ from this linear relationship is shown in FIG. 2 by curve 20 where $\overline{N}$ - N is plotted as a function of N for silica based fiber. The concentration of germanium on the axis has the maximum concentration of germanium equal to a molar concentration of 17 percent. The germanium concentration is reduced as one moves away from the axis and the refractive index decreases. To reduce the refractive index below that of pure silica, a material with 7 percent boron oxide is used at the core-cladding interface. The values for the relative group index $\overline{N}$ obtained for these various materials to be utilized in the fiber are illustrated in FIG. 2 wherein the first numeral associated with any given point refers to the molar concentration of germanium oxide and the second numeral refers to the molar concentration of boron oxide. By plotting the difference between $\overline{N}$ and N as in FIG. 2, a more accurate representation of the departure of $\overline{N}$ from a linear relationship with N can be shown. Note that the maximum value shown in FIG. 2 for N is, according to our definition equal to $2\Delta$. In that example, $N_{max} = 2\Delta = 0.0420$. Thus, $\Delta = 0.0210$.

Using the measured parameters set forth in FIG. 2, equation (5) can be solved to determine the value of $h(x,y)$ for each value of N (and therefore for each value of $n$) to be used in the fiber core. The values of $h(x,y)$ obtained for the various values of N using the materials under consideration are presented by curve 30 in FIG. 3, wherein the difference between N and $2\Delta h$ is plotted versus $h(x,y)$. By plotting the difference between N and $2\Delta h$, the departure of N from a linear relationship with $h$ can best be illustrated.

Figure 3:
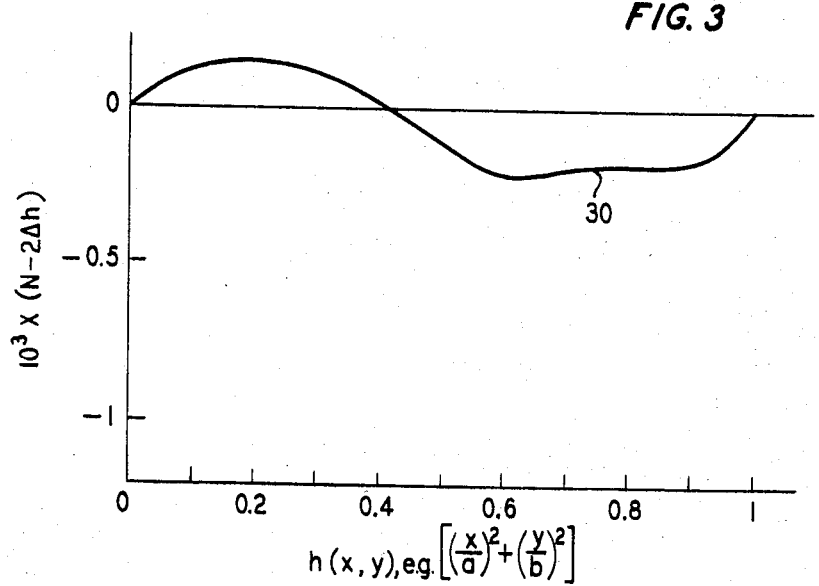
FIG. 3 is a curve which illustrates the values of N required for minimum modal dispersion using the materials system of FIG. 2 in terms of the difference between the relative phase index N and $2\Delta h$.

The curve of FIG. 3 is specific to the materials system illustrated in FIG. 2, but is general in that it is applicable to any core-cladding interface $h(x,y) = 1$.

To utilize the information presented in FIG. 3 of the drawings for a particular core-cladding interface, the index of refraction for any particular parameter $(x_1,y_1)$ within the fiber must first be substituted into the appropriate equation for $h(x,y)$ in order to determine the value of $h$. For example, if the index of refraction is to be determined for the point $x = a/2$ and $y = b/2$ substitution of these parameters into the equation for the elliptical contour illustrated in FIG. 1 and given as equation (10) yields a value of $h = 0.5$. Entry of the curve in FIG. 3 on the abscissa where $h = 0.5$ indicates that the relative phase index N for $(x_1,y_1)$ must differ from $2\Delta h$ by a value equal to approximately $-0.2 \times 10^{-3}$. Hence $N = (\Delta - 0.2 \times 10^{-3}) = 0.0208$ since, from FIG. 2, $\Delta = 0.0210$ and using the definition of N, the index of refraction at $x_1 = (a/2)$, $y_1 = (b/2)$, must equal $\sqrt{1 - 0.0208}\, n_o = 0.9895\, n_o$.

Figure 4:
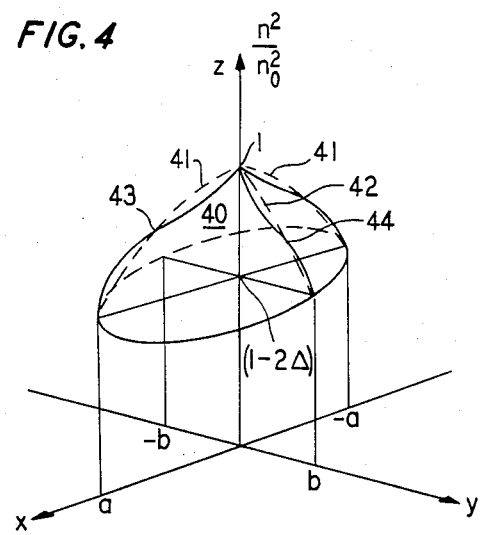
FIG. 4 is an illustration of the mathematical surface corresponding to the shape of the refractive index profile over a fiber core having an elliptical core-cladding interface.

When all of the spatial coordinates for the points within the elliptical fiber core in the fiber shown in FIG. 1 are solved, an index profile or map of the type illustrated by the surface 40 in FIG. 4 is obtained. In FIG. 4 the $x$ and $y$ coordinates are related to the spatial coordinates within the fiber core as indicated by the $x$ and $y$ coordinates in FIG. 1. The z axis coordinate in FIG. 4 corresponds to a normalized index of refraction $n^2/n_o^2$ where $n_o$ is the index of refraction at the fiber axis or geometrical center of the fiber core. As indicated in FIG. 4 the index of refraction on this axis is equal to $n_o$. As is further indicated in FIG. 4, the index of refraction at the core cladding interface is equal to $n_o\sqrt{1 - 2\Delta}$. If N were to equal to $2\Delta h$, the surface in FIG. 4 would be an elliptic paraboloid which intersects the $xz$ plane along the parabola 41 in FIG. 4, and intersects the $yz$ plane along the parabola 42 in FIG. 4. To achieve minimum modal dispersion using the materials system described hereinabove in connection with FIGS. 2 and 3, however, the normalized index of refraction contour 40 must be less than the elliptic paraboloid surface near the fiber axis (in that particular example) and must be greater than the elliptic paraboloid surface near the core-cladding interface. The departure from the elliptic paraboloid surface for the actual contour illustrated in FIG. 4 has been grossly exaggerated for illustrative purposes. The point 43 at which the contour in FIG. 4 intersects the elliptic paraboloid surface in the xz plane corresponds to the point in FIG. 3 where the curve crosses the axis at about $h = 0.4$. Along the $x$ coordinate this will correspond to the point $x = \sqrt{0.4a}$. The point 44 at which the contour intersects the elliptic paraboloid surface in the $yz$ plane corresponds to the point $y = \sqrt{0.4b}$.

In summary, the derived equations provide a means whereby the designer can develop a map of the index of refraction which will achieve minimum modal dispersion in an optical fiber waveguide core having a noncircularly symmetric index distribution. In brief, the materials chosen to be used are first measured in order to determine both the index of refraction $n$ and the rate of change of the index of refraction squared with respect to wavelength ($dn^2/d\lambda$). These measurements are made near the desired operating wavelength, for example $\lambda \approx 0.9\ \mu m$ for a typical heterojunction laser. The material having the largest index of refraction is then chosen for the core axis thereby determining $n_o$. The relative phase index N can then be determined for each of the remaining materials. The relative group index $\overline{N}$ can also be computed and considered to be a function of N for mathematical purposes. The function $\overline{N}$ of N is then inserted in the integral expression of equation (5). Thus the dependence of $h$ on N is obtained. An equation $h(x,y) = 1$ is chosen for the core-cladding interface, where $h(x,y)$ is any homogeneous function of degree 2 in $x$ and $y$. Setting the equation which has been chosen for $h$ equal to the value provided by the expression in the right half of equation (5) provides the locus for the index of refraction ($n$ or N) under consideration. Following this procedure for each of the materials to be utilized provides the entire map of the index of refraction for the entire core of the optical fiber waveguide.

Figure 5:
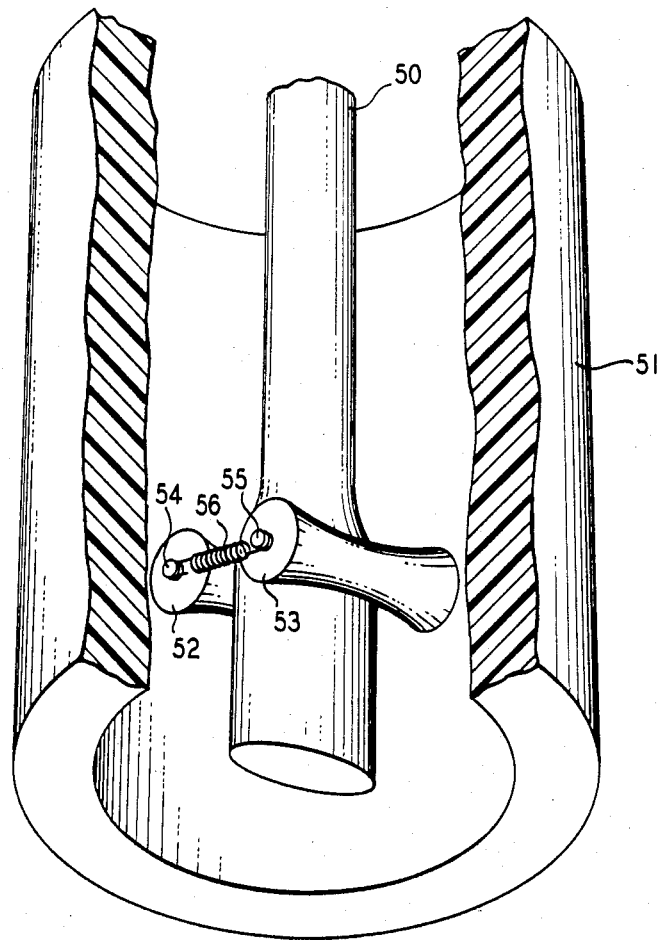
FIG. 5 is a pictorial illustration of an apparatus that can be utilized to construct an optical preform from which an optical fiber can be drawn in accordance with the present invention.

One technique for manufacturing the optical fiber described hereinabove with an elliptical core is illustrated in FIG. 5. A circular preform is first manufactured with a distribution of materials similar to the distribution determined by the above equations for the situation where $h(x,y)$ is a multiple of $(x^2 + y^2)$. This circular preform if drawn would yield a circularly symmetric fiber with minimum modal dispersion in accordance with the Marcatili invention. This glass preform designated as 50 in FIG. 5 is inserted into the input side of an oven 51 of the type commonly used to heat glass preforms in the optical fiber industry. Within oven 51 the glass preform 50 encounters graphite rollers 52 and 53 each of which has an exterior contour such that it forces the heated preform into an elliptical cross-section. Each graphite roller 51 and 52 is coupled by way of the axial rods 54 and 55 respectively to the other graphite cylinder under tension provided by way of spring 56 and an additional spring (not shown) at the other ends of the axial rods 54 and 55. As a result the graphite rollers are drawn under tension towards each other and the heated glass preform 50 when passing through the space between the graphite rollers is caused to develop an outer elliptical shape close to that of the type illustrated in FIG. 1. This elliptically shaped preform developed by the apparatus shown in FIG. 5 can then be inserted into the normal fiber drawing oven and an elliptically shaped fiber can be drawn from the preform. Measurements must then be made on the resulting noncircularly symmetric fiber in order to determine if the proper index profile has been achieved in the core of the fiber. Any deviation of this index profile from the optimum profile can then be eliminated by changing the shape of graphite rollers 52 and 53 keeping in mind that the exterior shape of the cladding is of very little importance.

Still other techniques can be utilized for the development of noncircularly symmetric fibers of the type described in this application. For example, the material can be deposited during the preform manufacturing stage in a non-symmetrical fashion such that the preform when collapsed will yield the desired index of refraction profile. What has been described hereinabove is an illustrative embodiment of the present invention. Numerous departures may be made by those skilled in the art without departing from the spirit and scope of the present invention.

APPENDIX A

EVALUATION OF THE RELATIVE GROUP INDEX $\overline{N}$

Let N denote the relative phase index $$N = 1 - n^2/n_o^2 \tag{A-1}$$

where $n$ is the refractive index and $n_o$ the value of $n$ on axis. We now define a relative group index $$\overline{N} = [d(K_o N)/d\Omega]/(dK_o/d\Omega) \tag{A-2}$$

where $\Omega = \omega^2$, $\omega/c = 2\pi/\lambda$, $K_o = k_o^2$, $k_o = (\omega/c)n_o$. The refractive index $n$ of the fiber material is usually a function of $x$, $y$ and $\omega$. However, in the present Appendix, we are not concerned with the spatial variation of $n$, but only with its dependence on $\omega$ (or $\lambda$). Thus, the $x$, $y$ arguments are omitted.

Assuming that the Sellmeier coefficients $A_1$, $A_2$, $A_3$, $l_1$, $l_2$, $l_3$ are known from measurements, we can evaluate the refractive index and the dispersion at any wavelength of interest. The refractive index is given by the Sellmeier law $$n^2 - 1 = \sum_{\gamma=1}^{3} A_\gamma (1 - \pi_\gamma)^{-1}; \pi_\gamma = \left(\frac{l_\gamma}{\lambda}\right)^2 \tag{A-3}$$

and we obtain the differentiation $$S = -\frac{\left(\frac{\lambda}{2}\right)dn^2}{d\lambda} = \sum_{\gamma=1}^{3} A_\gamma \pi_\gamma (1 - \pi_\gamma)^{-2} \tag{A-4}$$

Let $S_o$ denote the value of S on axis. We have, from the definitions of $\overline{N}$, S and $S_o$ $$\overline{N} = [N + (S_o - S)/n_o^2]/(1 + S_o/n_o^2) \tag{A-5}$$

APPENDIX B

DERIVATION OF THE FORMULA IN EQUATION (5)

The following derivation is based on scalar ray optics. The equations that describe the motion of optical pulses in inhomogeneous media (the space-time Hamilton equations) are given in the article by J. A. Arnaud entitled "Pulse Broadening in Multimode Optical Fibers", *Bell System Technical Journal*, 54, page 1179, September 1975. In that reference, it is shown [in Eqs. (2) and (4) of that reference] that the time of flight $t$ of a pulse along a ray, and the axial wave number (or propagation constant) $k_z$ are given, respectively, by $$k_z t = \frac{1}{2} \int_O^L \left(\frac{\delta K}{\delta \omega}\right) dz \tag{B-1}$$

and $$k_z^2 = L^{-1} \int_O^L \left[K + X\left(\frac{\delta K}{\delta X}\right) + Y\left(\frac{\delta K}{\delta Y}\right)\right] dz \tag{B-2}$$

In (B-1) and (B-2) L denotes the length of the fiber and we have defined $$X \equiv x^2; Y \equiv y^2 \tag{B-3}$$

$$K \equiv k^2; k \equiv (\omega/c)n(x,y,\omega); \omega/c \equiv 2\pi/\lambda \tag{B-4}$$

z denotes the coordinate along the fiber axis, $n(x,y,\omega)$ the refractive index, and $\lambda$ the optical wavelength in free space. In these equations, K and its derivatives are assumed to be known functions of X, Y and $\omega$. X and Y, in turn, are known functions of z once a ray trajectory $X = X(z)$, $Y = Y(z)$ has been specified. Thus, the integrands in (B-1) and (B-2) are known functions of z. It follows from (B-1) and (B-2) that any linear combination of $k_z t$ and $k_z^2$ can be expressed as an integral over z. Let us set $$ak_z^2 + bk_z t + c = 0 \tag{B-5}$$

and define the three constants $a$, $b$, $c$ from the condition that the variation of $t$ when $k_z$ varies be as small as possible. When $k_z$ is smaller than the cladding wavenumber $k_s$ [$\equiv (\omega/c)n_c$, where $n_c$ is the cladding index], the optical power for the ray considered leaks out. We may therefore restrict ourselves to rays that have $k_z > k_s$. On the other hand, the maximum value of $k_z$ is the wavenumber on axis $k_o$. Thus, the permissible variation of $k_z$ is $$k_s < k_z < k_o. \tag{B-6}$$

Taking into account the constraint that $t$ must be equal to the time of flight $t_o$ of pulses along the fiber axis when $k_z = k_o$, it is not difficult to show that the total change of $t$ in (B-5) is minimum (and therefore the impulse response width is minimum) if $t = t_o$ when $k_z = k_s$. This condition defines the values of $a$, $b$, $c$ in (B-5) to within a common factor. Equation (B-5) becomes $$k_z^2 - (k_o + k_s)(t/t_o)k_z + k_o k_s = 0 \tag{B-7}$$

Using (B-1), (B-2), (B-5) and (B-7), we find that this relation is satisfied if $$\int_O^L \left\{ \frac{1}{2} (k_o + k_s)\left(\frac{L}{t_o}\right)\left(\frac{\delta K}{\delta \omega}\right) \right. \tag{B-8}$$

$$- [K + X(\frac{\delta K}{\delta X}) + Y(\frac{\delta K}{\delta Y})]$$

$$\left. - k_o k_s \right\} dz = 0$$

This is the case, in particular, if the integrand in (B-8) is equal to zero.

We find it convenient at that point to introduce a relative phase index N, $$N(X,Y,\Omega) = 1 - K(X,Y,\Omega)/K_o(\Omega) \tag{B-9}$$

where $$K_o(\Omega) = K(O,O,\Omega); \Omega = \omega^2 \tag{B-10}$$

and a relative group index $\overline{N}$, as in (A-2)

$$\overline{N}(X,Y,\Omega) = [\delta(K_o N)/\delta\Omega]/(dK_o/d\Omega) \tag{B-11}$$

In terms of the refractive index $n$ and its derivative with respect to $\lambda$, N and $\overline{N}$ are, respectively $$N = 1 - n^2/n_o^2 \tag{B-12}$$

and $$\overline{N} = [N + (S_o - S)/n_o^2]/(1 + S_o/n_o^2) \tag{B-13}$$

where $$S = -(\lambda/2) dn^2/d\lambda \tag{B-14}$$

$$S_o = -(\lambda/2) dn_o^2/d\lambda \tag{B-15}$$

After a few rearrangings, we find that the integrand in (B-8) vanishes when $$X(\delta N/\delta X) + Y(\delta N/\delta Y) = (1+X)\overline{N} - N \tag{B-16}$$

where $$X = k_s/k_o = n_c/n_o = \sqrt{1 - 2\Delta}. \tag{B-17}$$

In general, $\overline{N}$ as well as N, may be a complicated function of X and Y. To simplify the solution of (B-16) we shall restrict ourselves to materials that can be specified by a single parameter, say $d$. This is the case, for example, when the dopant concentrations $d_1, d_2, \ldots$ have the form $d_1 = d_1(d)$, $d_2 = d_2(d) \ldots$ where the $d_i(d)$ are arbitrary functions of the (single) parameter $d$. We shall also assume that, when $\overline{N}$ is plotted against N for various values of the parameter $d$, a unique value of $\overline{N}$ corresponds to a given value of N, that is, $\overline{N}$ can be considered a function of N.

Because $\overline{N}$ is a function of N alone, (B-16) is a partial differential equation for N(X,Y) whose solutions provide the optimum profiles. The general solution of (B-16) is of the form $$h(x,y) = C \exp\left\{ \int^N [(1 + x)\overline{N} - N]^{-1} dN \right\} \tag{B-18}$$

where $h(x,y)$ denotes any homogeneous function of degree 2 in $x$ and $y$, and where C denotes an arbitrary constant. A function $f(x,y)$ is said to be homogeneous of degree $\alpha$ in $x$ and $y$ if $f(\gamma x, \gamma y) = \gamma^\alpha f(x,y)$ for any $\gamma$. The Euler theorem on homogeneous functions says that $(x\delta f/\delta x + y\delta f/\delta y)/f = \alpha$. This theorem follows from differentiation of the defining equation with respect to $\gamma$ and setting $\gamma = 1$. In the present case we have $\alpha = 2$.

The lower limit of integration can now be taken to be $N = 2\Delta$, where $2\Delta$ denotes the value assumed by N at the cladding. Changing the lower limit of integration in (B-18) merely amounts to changing the value of the arbitrary constant C. If we chose the lower limit as $2\Delta$, we have $h = 1$ when $N = 2\Delta$. On the other hand, we have $h = 0$ for $N = 0$ because the integral diverges as N (and $\overline{N}$) approaches 0.

It is useful to consider the special case where $\overline{N}$ is proportional to N, an assumption made implicitly in Section 4 of the previously cited article by J. A. Arnaud "Pulse Broadening in Multimode Optical Fibers", *Bell System Technical Journal* 54, 1174, September 1975

$$\overline{N} = D_k N \tag{B-19}$$

where $D_k$ is an arbitrary constant, in (B-18) and integrating we obtain $$N(x,y) = C' h^k \tag{B-20}$$

where $$k = (1+X)D_k - 1 \tag{B-21}$$

and C' is a new arbitrary constant. It is not difficult to show that stating the proportionality of $\overline{N}$ to N is equivalent to stating the linearity of $dn^2/d\lambda$ as a function of $n^2$, or approximately, for very weakly guiding fibers, the linearity of $dn/d\lambda$ as a function of $n$. The above result shows that, when the linear approximation (B-19) holds, the optimum relative index profile is a homogeneous function of degree 2k in $x$ and $y$, where k is defined in (B-21) $X = n_c/n_o = \sqrt{1 - 2\Delta}$ for minimum impulse response width. The degree k is unity when $D_k = 1$ (no material dispersion) and $X = 1$ (very weakly guiding fibers $n_c \approx n_o$). Relation (B-21) can be written alternatively $$\frac{D_k}{1+k} = \frac{1}{1+x} \tag{B-22}$$

(B-22) is the form given earlier by the applicant in his above-identified article in the Bell System Technical Journal.

What is claimed is:

1. An optical fiber waveguide comprising a core surrounded by a layer of cladding material, the refractive index of said layer $n_c$ being less than $n_o$ the value of the index of refraction at the center of the core, and the index of refraction $n$ in said core is graded in accordance with the following equation:

$$n^2 = n_o^2(1-N)$$

where N is the relative phase index equal to 0 at the center of said core and equal to $2\Delta$ at the core-cladding interface, $\Delta$ being equal to $1/2(1 - n_c^2/n_o^2)$, characterized in that the relative index N has values at the coordinates $x$ and $y$ with respect to the core center given by the following equation:

$$h(x,y) = \exp \int_{2\Delta}^{N} [(1 + \sqrt{1-2\Delta})\overline{n} - N]^{-1} dN$$

where $h(x,y)$ is any arbitrary homogeneous function of degree 2 in $x$ and $y$ other than a multiple of $(x^2 + y^2)$, and $\overline{N}$ is a relative group index approximately given in terms of N by the following equation:

$$\overline{N} = [N + (S_o - S)/n_o^2]/(1 + S_o/n_o^2),$$

S being equal to $[-(\frac{1}{2})dn^2/d\lambda]$ which is determined by measurements on the materials to be used to obtain the various values of $n$ within the core, and $S_o$ is the value of S at the core center.

2. An optical fiber waveguide as defined in claim 1 wherein $h(x,y)$ is an elliptical function defined by the following equation:

$$h(x,y) = (x/a)^2 + (y/b)^2$$

where $a$ equals half of the diameter of the fiber core in the largest dimension and $b$ equals half of the diameter of the fiber core in the smaller dimension.

* * * * *